United States Patent [19]
Okajima et al.

[11] Patent Number: 6,097,208
[45] Date of Patent: *Aug. 1, 2000

[54] SIGNAL-TRANSFER SYSTEM AND SEMICONDUCTOR DEVICE FOR HIGH-SPEED DATA TRANSFER

[75] Inventors: Yoshinori Okajima; Tsuyoshi Higuchi, both of Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/823,014

[22] Filed: Mar. 21, 1997

[30] Foreign Application Priority Data

Oct. 2, 1996 [JP] Japan .................................. 8-262126

[51] Int. Cl.[7] .................................................. H03K 17/16
[52] U.S. Cl. ............................... 326/26; 326/30; 326/86; 326/57; 326/81
[58] Field of Search .................................. 326/30, 57, 58, 326/83, 86, 87, 68, 80, 81, 26

[56] References Cited

U.S. PATENT DOCUMENTS

| | | | |
|---|---|---|---|
| 5,179,299 | 1/1993 | Tipon | 326/86 |
| 5,347,177 | 9/1994 | Lipp | 326/30 |
| 5,391,940 | 2/1995 | Linn | 326/83 |
| 5,481,207 | 1/1996 | Crafts | 326/30 |
| 5,585,740 | 12/1996 | Tipon | 326/86 |
| 5,592,108 | 1/1997 | Tsukahara | 326/68 |
| 5,602,494 | 2/1997 | Sundstrom | 326/30 |
| 5,717,345 | 2/1998 | Yokomizo et al. | 326/86 |
| 5,719,509 | 2/1998 | Chan | 326/87 |

*Primary Examiner*—Jon Santamauro
*Assistant Examiner*—Don Phu Le
*Attorney, Agent, or Firm*—Arent Fox Kintner Plotkin Kahn, PLLC

[57] ABSTRACT

A signal-transfer system for transferring a signal via a line having no anti-signal-reflection resistor. The signal-transfer system includes a line having an equalized characteristic impedance $Z_0$, and an output circuit having an output turn-on resistance $Z_0/2$ and outputting to the line a signal which has a voltage difference between a high level and a low level smaller than about 1 V.

30 Claims, 16 Drawing Sheets

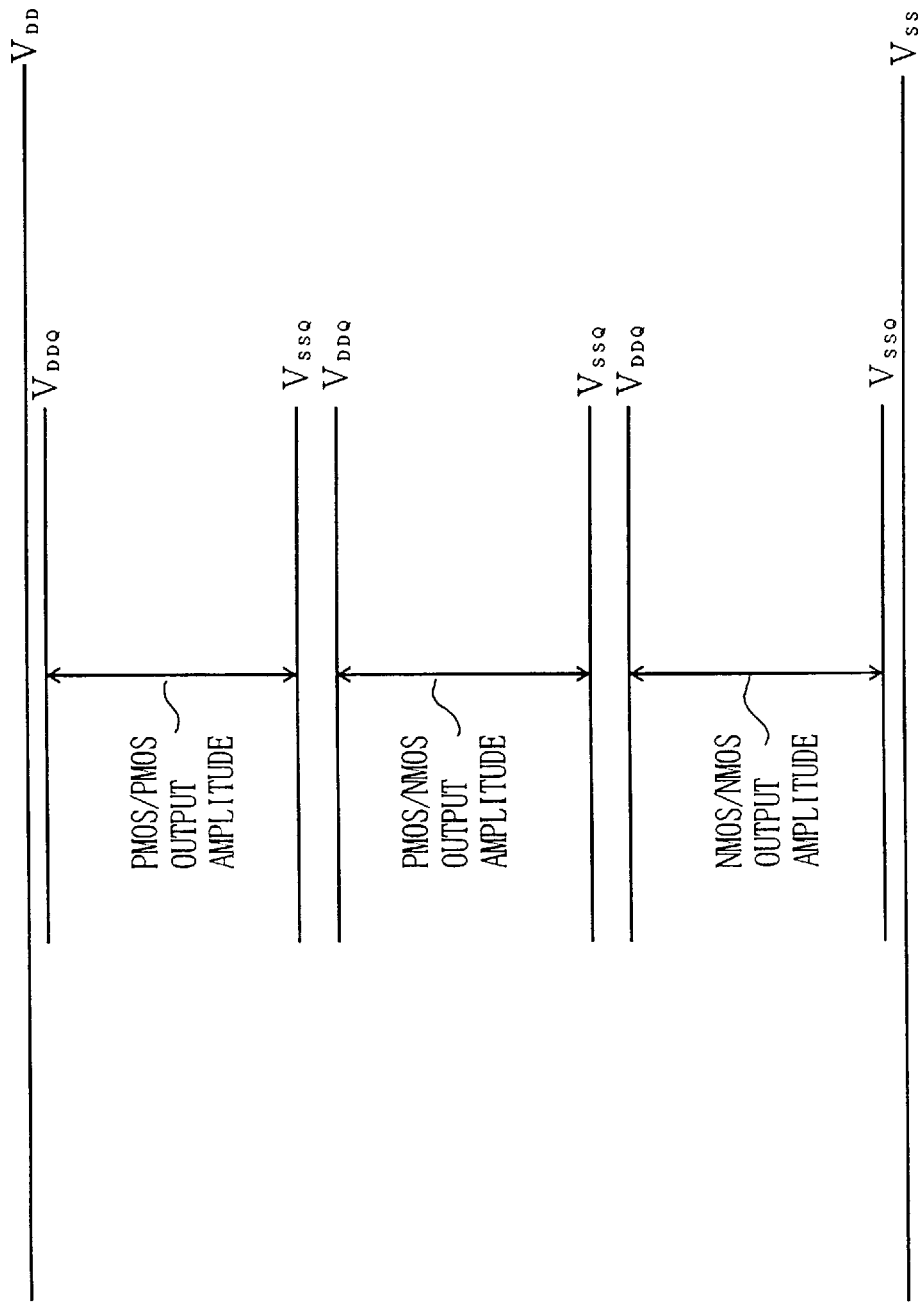

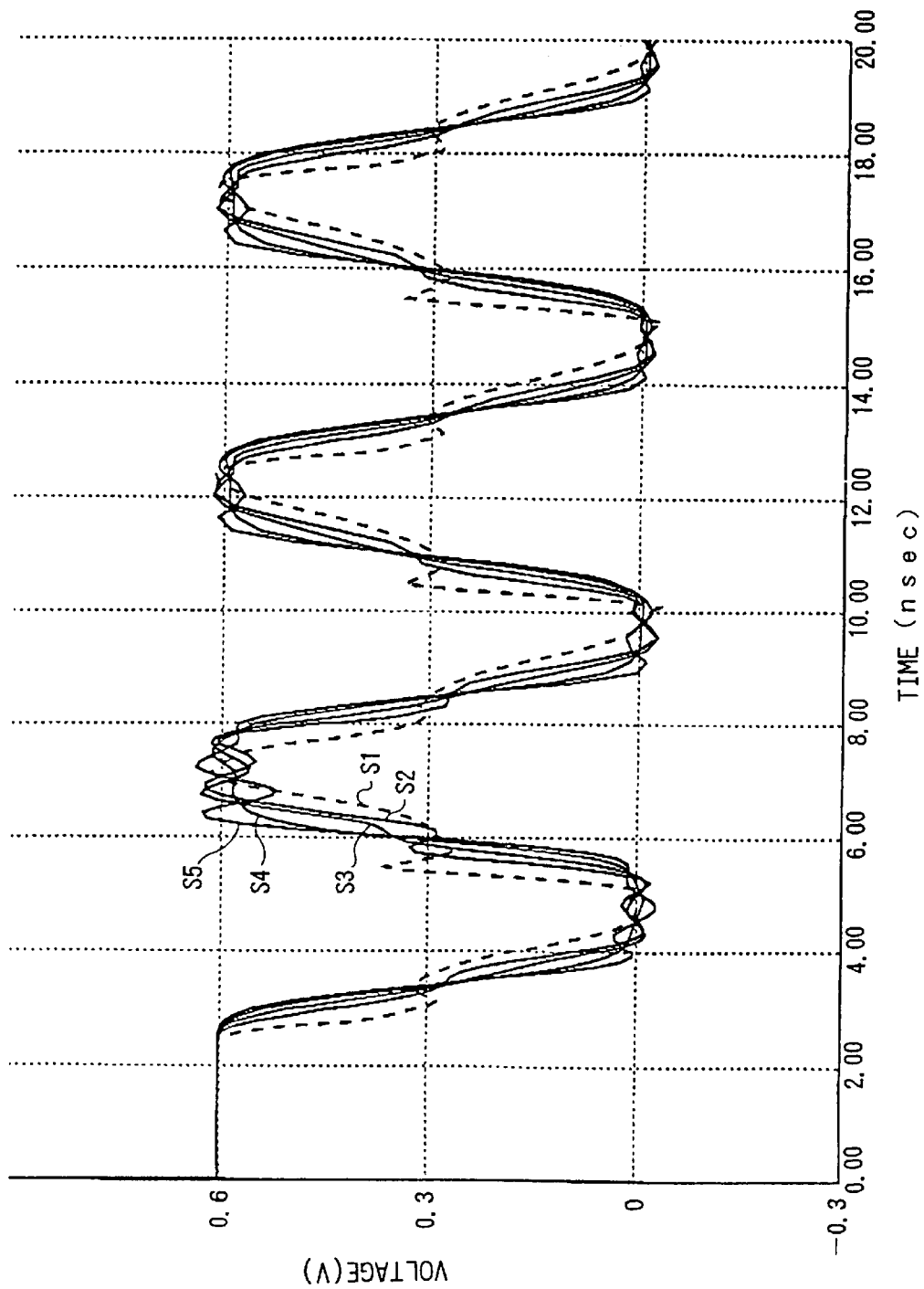

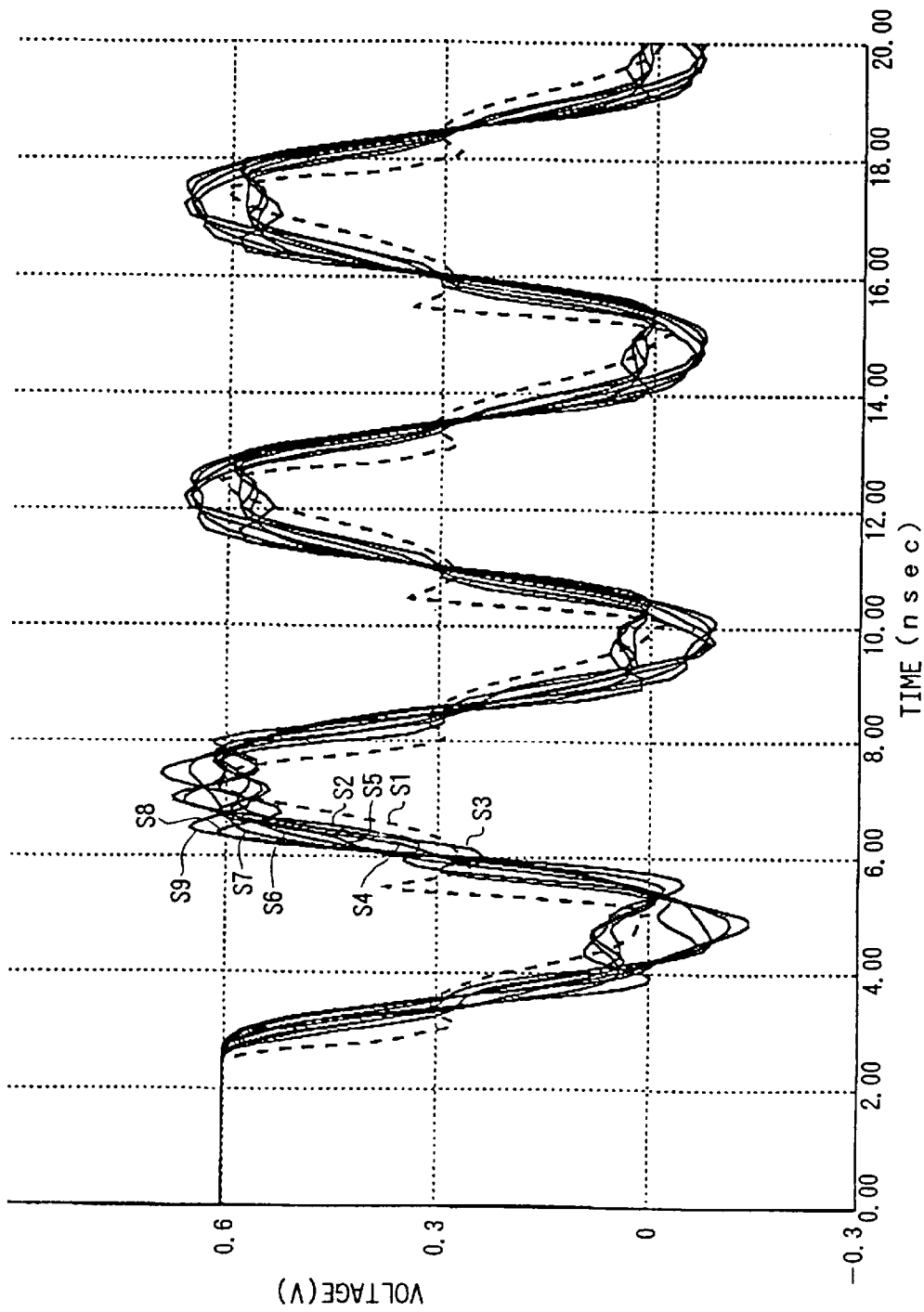

SIGNAL-TRANSFER SYSTEM AND SEMICONDUCTOR DEVICE FOR HIGH-SPEED DATA TRANSFER

BACKGROUND OF THE INVENTION

1. Field of the Invention

The present invention generally relates to data-transfer systems using a bus, and particularly relates to a data-transfer system which drives a bus with signals of a small amplitude.

2. Description of the Related Art

As a processing speed of microprocessors is enhanced, a data transfer between LSI chips is expected to have an increased data-transfer speed based on an increased signal frequency. However, use of the TTL level or the CMOS level, which are input/output levels of the prior-art LSI, suffers an increased influence of signal reflection and crosstalk as a signal frequency begins to exceed about 50 MHz. In such a case, it is difficult to conduct errorless data transfer.

In order to overcome this problem, various input/output interfaces have been proposed, including GTL (Gunning transceiver logic), SSTL (sub series terminated logic), RAMBUS, etc.

These input/output interfaces suppress signal reflection at the ends of a bus by terminating the bus with termination resistances (anti-signal-reflection resistances), and use small-amplitude signals having an amplitude smaller than 1 V. This is because use of small-amplitude signals generally enables high-speed data transfer since a signal frequency which can be transferred is reciprocal to the amplitude voltage.

In the prior-art input/output interfaces such as GTL, SSTL, RAMBUS, and the like, however, a voltage level of the bus is not stable because of the connection of the bus to the terminal voltage $V_{TT}$ via the terminal resistances.

FIG. 1 is an illustrative drawing showing a system configuration of the SSTL. In the SSTL, as shown in FIG. 1, an output circuit 200 is coupled to a bus 201 via a stub resistance Rs, and the bus 201 is connected to a termination voltage $V_{TT}$ via termination resistances $R_{TT}$. The termination resistances $R_{TT}$ are provided in order to suppress signal reflection at the ends of the bus 201, and the stub resistance Rs is used for reducing signal reflection between a stub (a branch stemming from the bus 201) 202 and the bus 201. A bus configuration of the GTL is the same as that of FIG. 1, except for the existence of the stub resistance Rs.

Assume that a PMOS transistor 205 and an NMOS transistor 206 in the output circuit 200 are turned off and on, respectively, in the SSTL system of FIG. 1. In this case, the output circuit 200 outputs a low-level signal. A voltage $V_{SS}$ of the output circuit 200 is coupled to the termination voltage $V_{TT}$ via an on-resistance (turn-on resistance) of the NMOS transistor 206, the stub resistance Rs, and the termination resistances $R_{TT}$. Namely, the voltage of the bus 201 is determined as a voltage at a middle point of a resistance series. Because of this, variations of the on-resistance of the transistor, the stub resistance Rs, and the termination resistances $R_{TT}$ contribute to a variation in the voltage of the bus 201.

A variation of the bus voltage due to variations of the transistor on-resistance, the termination resistances $R_{TT}$, and the like is similarly observed in other input/output interfaces such as the GTL, RAMBUS, or the like.

With a variation of a bus voltage, an operation voltage of the system cannot be set to a minimum voltage with which the system can operate, and, thus, the system should be allowed to operate with a large amplitude to provide a margin to some extent. In this case, use of small-amplitude signals by terminating the bus with termination resistances will be compromised, and the signal transfer based on a desired small amplitude becomes difficult. In order to avoid this, RAMBUS, for example, is provided with a compensation circuitry for suppressing the bus-voltage variation. This compensation circuitry, however, adds to the complexity of the entire circuit, and requires a manufacturing process of high technology.

Another problem commonly associated with the input/output interfaces such as GTL, SSTL, RAMBUS, and the like is that the bus connection to the termination voltage via the termination resistances entails generation of a DC current when the signal level of the bus is either a high level or a low level. This DC current brings about excessive power consumption, which is as much as about 15 mW per output pin. In a situation where an emphasis is placed on a reduction in power consumption as in the application to portable equipment, such excessive power consumption is not desirable.

Accordingly, there is a need for a high-speed data transfer system which can use small-amplitude signals without requiring termination via termination resistances.

SUMMARY OF THE INVENTION

Accordingly, it is a general object of the present invention to provide a data-transfer system which can satisfy the need described above.

It is another and more specific object of the present invention to provide a high-speed data transfer system which can use small-amplitude signals without requiring termination via termination resistances.

In order to achieve the above object according to the present invention, a signal-transfer system for transferring a signal via a line having no anti-signal-reflection resistance includes a line having an equalized characteristic impedance $Z_0$, and an output circuit having an output resistance $Z_0/2$ and outputting to the line a signal which has a voltage difference between a high level and a low level smaller than about 1 V.

In the above signal-transfer system, small-amplitude signals are transferred via the line, and impedance matching is provided between the output circuit and the line, so that signals reflected at the ends of the line are absorbed at a point between the output circuit and the line without being reflected again. Therefore, a high-speed data transfer using small-amplitude signals is achieved.

Other objects and further features of the present invention will be apparent from the following detailed description when read in conjunction with the accompanying drawings.

BRIEF DESCRIPTION OF THE DRAWINGS

FIG. 4 is an illustrative drawing showing relations between output power voltages $V_{DDQ}$ and $V_{SSQ}$ and internal power voltages $V_{DD}$ and $V_{SS}$ with regard to the cases of an NMOS transistor pair, a PMOS transistor pair, and a PMOS-NMOS transistor pair which are used as the driver transistors;

FIG. 7 is a chart showing results of a signal-transfer simulation under simulation conditions shown in FIG. 6A;

FIG. 8 is a chart showing results of a signal-transfer simulation under simulation conditions shown in FIG. 6B;

DESCRIPTION OF THE PREFERRED EMBODIMENTS

In the following, a principle and embodiments of the present invention will be described with reference to the accompanying drawings.

Figure 1:
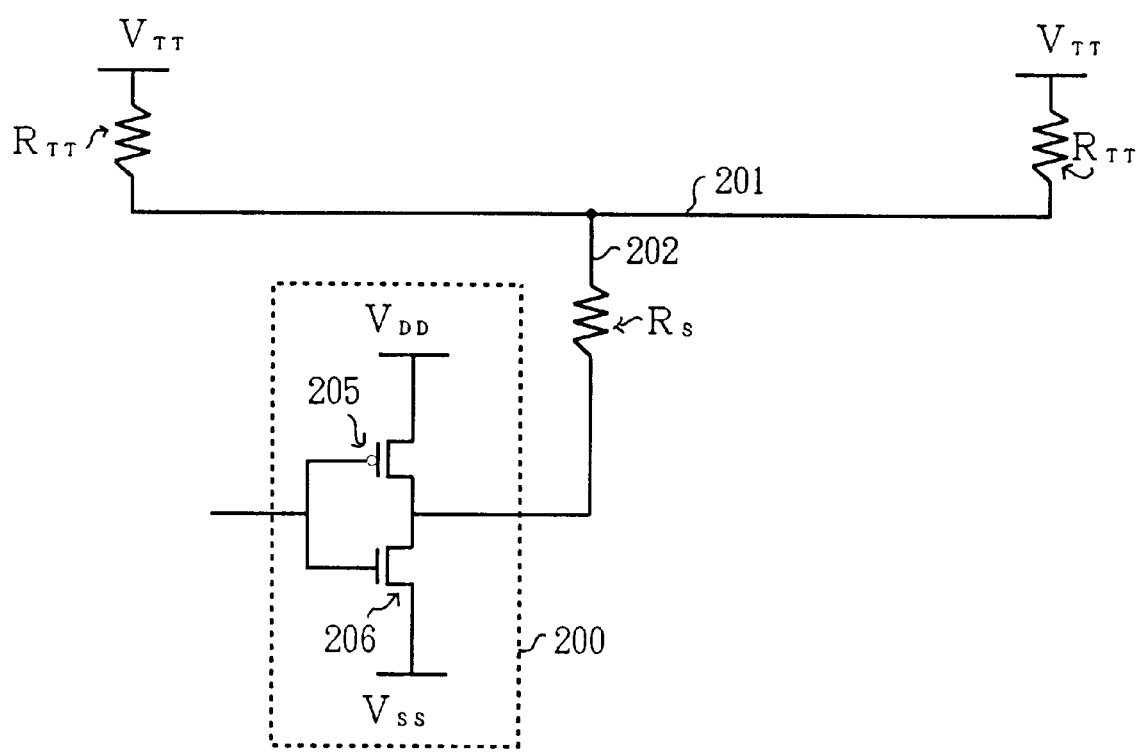
FIG. 1 is an illustrative drawing showing a system configuration of the SSTL.
Figure 2:
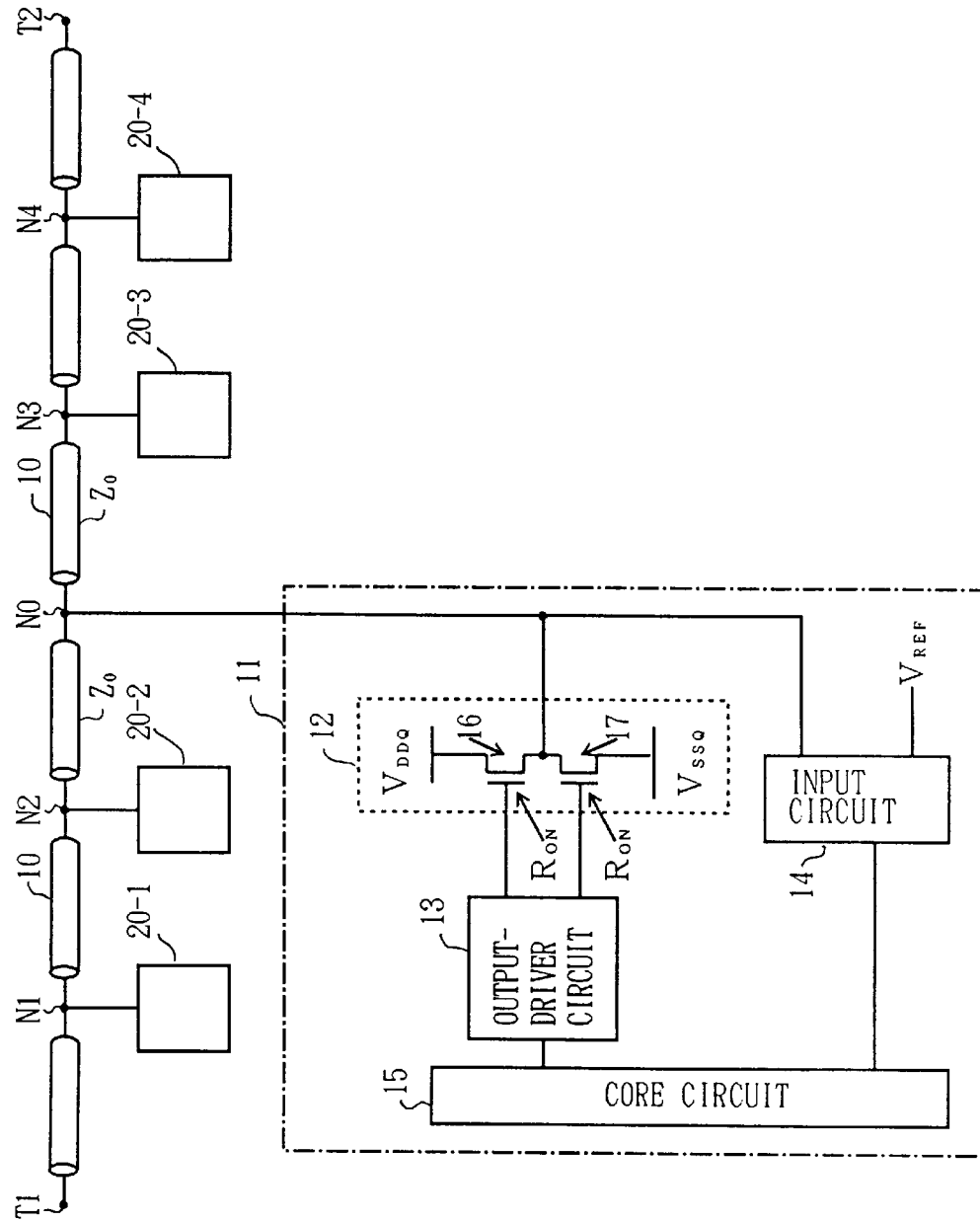
FIG. 2 is an illustrative drawing showing an example of a data-transfer system according to a principle of the present invention.

FIG. 2 is an illustrative drawing showing an example of a data-transfer system according to a principle of the present invention.

The data-transfer system of FIG. 2 includes a bus 10 having an equalized characteristic impedance $Z_0$, a driver device 11, and a plurality (four in the figure) of receiver devices 20-1 through 20-4 which are connected to the bus 10. The driver device 11 is a memory controller, for example. The receiver devices 20-1 through 20-4 are memories, for example.

The driver device 11 includes an output circuit 12, an output-driver circuit 13, an input circuit 14, and a core circuit (internal circuit) 15. The core circuit 15 is a circuit for controlling the memories, for example, in the case of a memory controller. The output circuit 12 includes a driver transistor 16 and a driver transistor 17. The driver transistors of the output circuit 12 may be a pair of NMOS transistors as shown in FIG. 2, or may be a PMOS transistor and an NMOS transistor or a pair of PMOS transistors. The driver transistors 16 and 17 of the output circuit 12 each have an on-resistance (output turn-on resistance) $R_{ON}$. Power voltages $V_{DDQ}$ and $V_{SSQ}$ for driving the output circuit 12 have a voltage difference smaller than about 1 V. With this voltage difference, a signal output from the output circuit 12 is a small-amplitude signal having an amplitude smaller than about 1 V, thereby achieving a high-speed data transfer via the bus 10.

The on-resistance RON of the driver transistors 16 and 17 is set such that $R_{ON}$ is nearly equal to $Z_0/2$. With such a setting of the on-resistance $R_{ON}$, a signal output from the driver device 11 to the bus 10 is free from reflection at a node N0. This is because impedance matching is achieved between the driver device 11 and the bus 10. It should be noted that since the characteristic impedance of the bus 10 is $Z_0$, a characteristic impedance of the bus 10 extending in both directions from the node N0 is $Z_0/2$ when viewed from the driver device 11.

The on-resistance $R_{ON}$ may be substantially $Z_0/2$ as described above. The range of the on-resistance $R_{ON}$ is broad, however, and a range substantially between $Z_0/4$ and $Z_0$ suffice to provide a desired effect in preventing signal reflection.

In the data-transfer system of FIG. 2, the driver device 11 is preferably placed at a midpoint of the bus 10. In this case, as the driver device 11 transmits a signal to the bus 10, signals reflected at ends T1 and T2 of the bus 10 come back to the node N0 substantially at the same time. In effect, this situation is the same as a situation in which a signal propagates from a line having a characteristic impedance $Z_0/2$ to a line having a resistance $R_{ON}$, so that signal reflection at the node N0 is prevented because of the impedance matching. Therefore, the signals reflected by the ends T1 and T2 disappear at the node N0 because they are absorbed at this point.

As a location of the driver device 11 is deviated further from the midpoint of the bus 10, there is an increased difference in arrival time at the node N0 between signals reflected at the ends T1 and T2 of the bus 10. Assume that these reflected signals arrive at the node N0 at completely different timings. With regard to the signal reflected at the end T1, the node N0 is a branch point from which one line extends to the driver device 11 and the other line extends to the right-hand side of the figure as the bus 10. Namely, this signal arrives at the branch point from which the line of the resistance $R_{ON}$ and the other line of a characteristic impedance $Z_0$ extend in different directions, so that no impedance matching is provided for this signal. Because of this, as the location of the driver device 11 is further distanced from the midpoint of the bus 10, a greater reflection takes place at the node N0 with respect to the signals reflected at the ends T1 and T2.

In the data-transfer system of FIG. 2, it is also preferable to arrange nodes N1 through N4 at positions of symmetry with regard to a center point at the node N0. Here, the node N0 is a branch point for the driver device 11, and the nodes N1 through N4 are branch points for the receiver devices 20-1 through 20-4, respectively. It should be noted that signal reflection occurs at any of the nodes N1 through N4. If the nodes N1 through N4 are arranged in symmetry with regard to the center point at the node N0, however, reflected signals from the nodes N2 and N3 simultaneously reach the node N0, and so do the reflected signals from the nodes N1 and N4. Even when there are signal reflections at the nodes N1 through N4, therefore, further reflection at the node N0 can be avoided. As a result, these reflected signals from the nodes N1 through N4 are absorbed at the node N0.

The output-driver circuit 13 provides a control voltage for gate inputs of the driver transistors 16 and 17 in the output circuit 12, and makes the output circuit 12 output a signal based on a signal from the core circuit 15. When both driver transistors 16 and 17 are NMOS transistors as shown in FIG. 2, the gate inputs of the driver transistors 16 and 17 are complementary signals, i.e., one of the signals is high whenever the other one is low. The output-driver circuit 13 may generate an inverse of a signal from the core circuit 15 by using an inverter, for example, and may provide this inverted signal and the signal from the core circuit 15 to the output circuit 12. A configuration of the output-driver circuit 13 is simple and well within the scope of ordinary skill in the art, and a description thereof will be omitted. It should be noted that both gate inputs to the driver transistors 16 and 17 are set to LOW when the output impedance needs to be set to an infinite level in a tri-state configuration of signal transfer.

The driver device 11 detects an input signal by using the input circuit 14, which compares the input signal with a reference voltage $V_{REF}$ and amplifies the difference. The detected signal is supplied to the core circuit 15. A conventional differential amplifier circuit can be used as the input circuit 14. A configuration of such a circuit is within the scope of ordinary skill in the art, and a description thereof will be omitted.

The output-driver circuit 13 and the core circuit 15 of FIG. 2 may be driven by internal power voltages $V_{DD}$ and $V_{SS}$, which are different from the power voltages $V_{DDQ}$ and $V_{SSQ}$ used for the signal output. Namely, the present invention may use small-amplitude signals only for output signals, and the internal circuit may be driven by the power voltage levels equal to those conventionally used. Further, use of the internal power voltages $V_{DD}$ and $V_{SS}$ having a voltage difference larger than that of the output power voltages $V_{DDQ}$ and $V_{SSQ}$ has an advantage in that the on-resistances of the driver transistors 16 and 17 are easily adjusted.

The bus 10 generally has a characteristic impedance of about 25 Ω, so that the on-resistance $R_{ON}$ should be set to around 12.5 Ω. An adjustment of the on-resistance $R_{ON}$ is achieved by adjusting the voltage applied to the gate input or by adjusting a gate width of the driver transistors 16 and 17. If the output power voltages $V_{DDQ}$ and $V_{SSQ}$ are applied to the gate input, for example, the gate width of the driver transistors 16 and 17 should be made fairly large in order to achieve a desired value of the on-resistance $R_{ON}$. This is not preferable when a limited area in a chip is taken into consideration. If the internal power voltages $V_{DD}$ and $V_{SS}$ are used as the gate input for producing a larger voltage difference, however, the on-resistance $R_{ON}$ of the driver transistors 16 and 17 is easily set to a desired small value.

Assume that the internal power voltages ($V_{DD}$, $V_{SS}$) are (3 V, 0 V) and that the output power voltages ($V_{DDQ}$, $V_{SSQ}$) are (1 V, 0 V). In order to produce a low-level output signal, the driver transistor 16 needs to have a gate input of 0 V, and the gate input of the driver transistor 17 should receive 3 V. As a consequence, a voltage between the gate and the source of the driver transistor 17 becomes 3 V, which can provide a sufficiently low value of the on-resistance $R_{ON}$. On the other hand, if the gate input of the driver transistor 17 receives only 1 V, the driver transistor 17 should have a wider gate width, which is not preferable because of the above-described reason. What is described here applies as well in the case in which the output signal is at a high level.

Figure 3A:
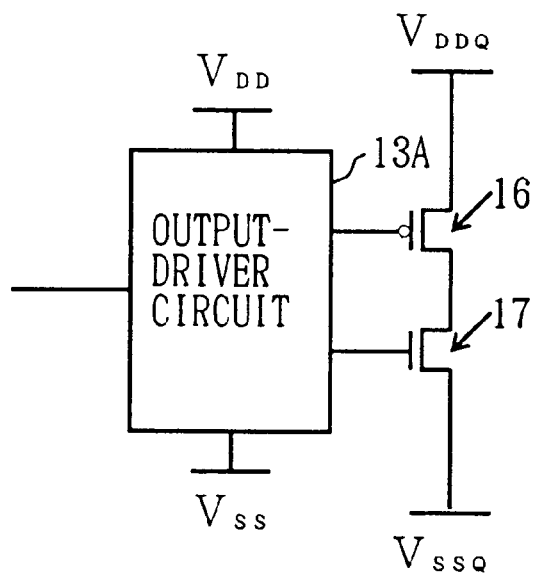
FIGS. 3A and 3B are illustrative drawings of configurations in which a PMOS transistor and an NMOS transistor are used as driver transistors on the one hand, and two PMOS transistors are used as the driver transistors on the other hand.
Figure 3B:
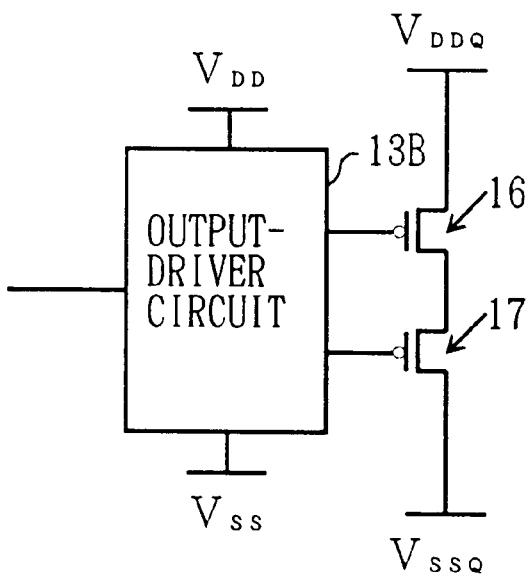

FIGS. 3A and 3B are illustrative drawings of configurations in which a PMOS transistor and an NMOS transistor are used as the driver transistors 16 and 17 on one hand, and two PMOS transistors are used on the other hand. When a PMOS transistor and an NMOS transistor are used as the driver transistors 16 and 17 as shown in FIG. 3A, an output-driver circuit 13A supplies the same signal, rather than complementary signals, to the gate inputs of the driver transistors 16 and 17 at the time of signal output. When two PMOS transistors are used as the driver transistors 16 and 17 as shown in FIG. 3B, an output-driver circuit 13B supplies complementary signals to the gate inputs of the driver transistors 16 and 17 at the time of signal output, and these complementary signals are phase-reversed compared to the case of FIG. 2.

FIG. 4 is an illustrative drawing showing relations between the output power voltages $V_{DDQ}$ and $V_{SSQ}$ and the internal power voltages $V_{DD}$ and $V_{SS}$ with regard to the cases of an NMOS transistor pair, a PMOS transistor pair, and a PMOS-NMOS transistor pair which are used as the driver transistors 16 and 17.

In the case of the NMOS transistor pair, a voltage which is received by the gate inputs for turning on the driver transistors 16 and 17 should be higher than the output power voltages $V_{DDQ}$ and $V_{SSQ}$ by as large a margin as possible in order to make the on-resistance $R_{ON}$ as small as possible. Because of this, as shown in FIG. 4, the range ($V_{DDQ}$, $V_{SSQ}$) of the output power voltage is preferably positioned at a voltage area as low as possible within the range ($V_{DD}$, $V_{SS}$) of the internal power voltage. If the internal power voltages ($V_{DD}$, $V_{SS}$) are (3 V, 0 V), for example, the output power voltages ($V_{DDQ}$, $V_{SSQ}$) should be as close to 0 V as possible, and, thus, may be set to about (1 V, 0 V).

In the case of the PMOS-NMOS transistor pair, a voltage higher than the output power voltages $V_{DDQ}$ and $V_{SSQ}$ by as large a margin as possible should be applied to the gate input in order to turn on the NMOS transistor and achieve as small an on-resistance $R_{ON}$ as possible. Further, a voltage lower than the output power voltages $V_{DDQ}$ and $V_{SSQ}$ by as large a margin as possible should be applied to the gate input in order to turn on the PMOS and achieve as small an on-resistance $R_{ON}$ as possible. Therefore, as shown in FIG. 4, the range ($V_{DDQ}$, $V_{SSQ}$) of the output power voltage is preferably positioned around a midpoint within the range ($V_{DD}$, $V_{SS}$) of the internal power voltage. If the internal power voltages ($V_{DD}$, $V_{SS}$) are (3 V, 0 V), for example, the output power voltages ($V_{DDQ}$, $V_{SSQ}$) may be preferably set to about (2 V, 1 V).

In the case of the PMOS transistor pair, a voltage which is applied to the gate inputs for turning on the driver transistors 16 and 17 should be lower than the output power voltages $V_{DDQ}$ and $V_{SSQ}$ by as large a margin as possible in order to make the on-resistance $R_{ON}$ as small as possible. Because of this, as shown in FIG. 4, the range ($V_{DDQ}$, $V_{SSQ}$) of the output power voltage is preferably positioned at a voltage area as high as possible within the range ($V_{DD}$, $V_{SS}$) of the internal power voltage. If the internal power voltages ($V_{DD}$, $V_{SS}$) are (3 V, 0 V), for example, the output power voltages ($V_{DDQ}$, $V_{SSQ}$) should be as close to 3 V as possible, and, thus, may be set to about (3 V, 2 V).

Regardless of combinations of transistor types used for the driver transistors 16 and 17, the range ($V_{DDQ}$, $V_{SSQ}$) of the output power voltage is preferably narrower than one third of the range ($V_{DD}$, $V_{SS}$) of the internal power voltage in order to achieve as low an on-resistance $R_{ON}$ as possible. In order to adjust the on-resistance $R_{ON}$ to an appropriate value, it is preferable for the output-driver circuit 13, 13A, or 13B to be able to adjust the gate voltages which are applied to the driver transistors 16 and 17 based on the internal power voltages $V_{DD}$ and $V_{SS}$.

In FIG. 2, the driver device 11 is preferably positioned around a midpoint of the bus 10 as previously described. Such a limitation is not preferable, however, in light of the fact that the receiver devices 20-1 through 20-4 connected to the bus 10 may operate as driver devices to output signals in some cases. In order to eliminate this limitation, the bus 10 may be structured in a loop.

Figure 5:
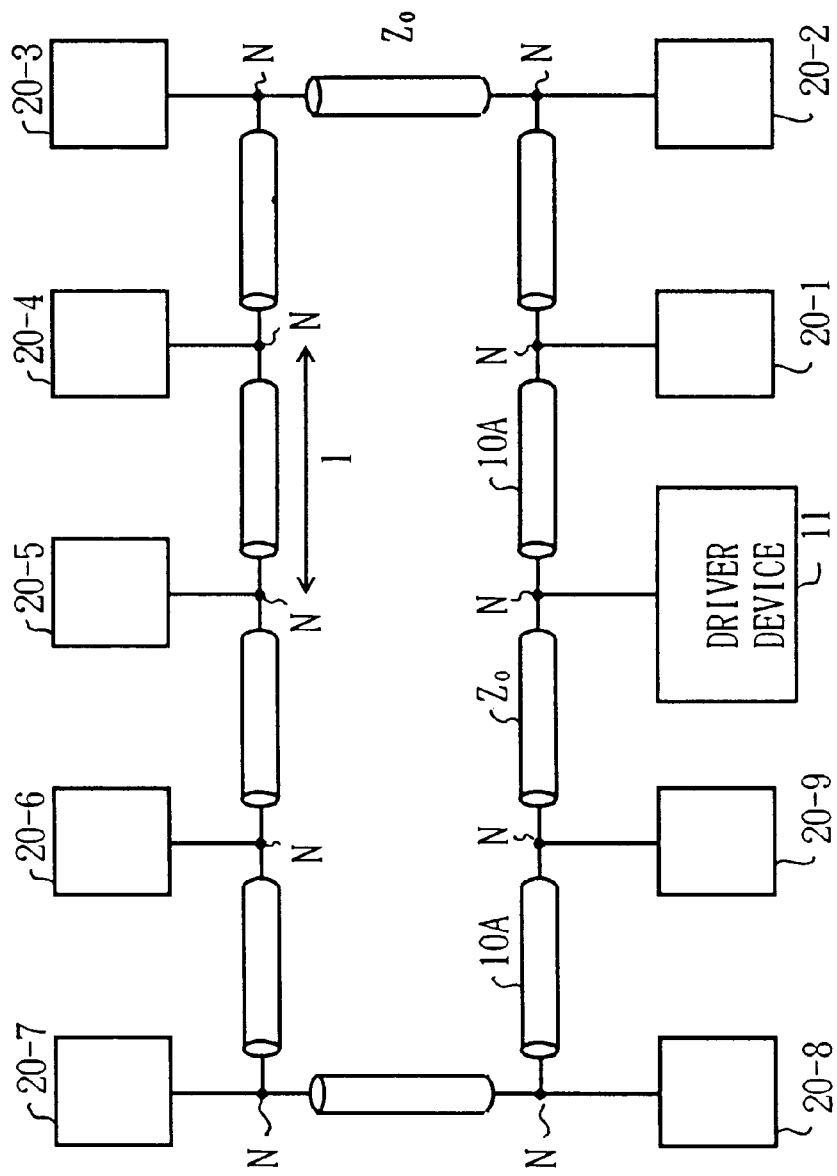
FIG. 5 is an illustrative drawing showing an example of a data-transfer system which has a looped bus according to the principle of the present invention.

FIG. 5 is an illustrative drawing showing an example of a data-transfer system which has a looped bus according to the principle of the present invention. In FIG. 5, a bus 10A having the characteristic impedance $Z_0$ is structured in a loop, and the driver device 11 and receiver devices 20-1 through 20-9 are connected to the bus 10A. Equal intervals 1 are provided between nodes N, which are branch points from the bus 10A to the driver device 11 and the receiver devices 20-1 through 20-9.

Since the bus 10A has a looped shape, there is no signal reflection at bus ends. However, a signal transmitted from the driver device 11 propagates in two different directions after entering the bus 10A, and goes once round the bus 10A clockwise and counterclockwise before coming back to the driver device 11. The signals propagating clockwise and counterclockwise reach the node N of the driver device 11 at the same time, so that signal reflection is suppressed by impedance matching in the same manner as in the case of FIG. 2.

Because of the looped structure of the bus 10A, returning signals are absorbed without reflection through the impedance matching regardless of the position along the bus 10A of the driver device 11.

Since the nodes N are arranged at equal intervals, a signal reflected at a given node N comes back to the node N of the driver device 11 at the same time as a signal reflected at a counterpart node N existing in an opposite direction. This is true regardless of the position along the bus 10A of the driver device 11. Therefore, a signal reflected at any one of the nodes N is absorbed without reflection because of the impedance matching.

In what follows, a description will be given with regard to a simulation in which a signal alternating between a high level and a low level at equal intervals is output.

Figure 6A:
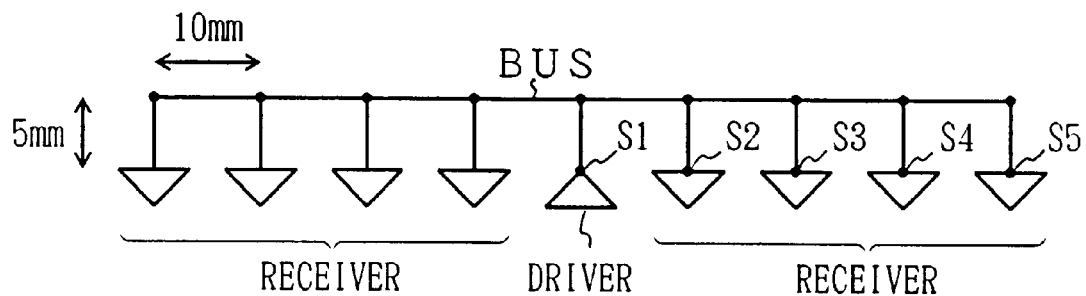
FIG. 6A is an illustrative drawing showing conditions of a simulation in which a driver at a midpoint of a bus outputs a signal to the bus, and receivers are arranged at equal intervals along the bus.

FIG. 6A is an illustrative drawing showing conditions of a simulation in which a driver at a midpoint of a bus outputs a signal to the bus, and receivers are arranged at equal intervals along the bus. The output signal has a frequency of 200 MHz and alternates between a high level and a low level with a period of 5 ns. Eight receivers are connected to 5-mm stubs which are arranged at 10-mm intervals. Signals are observed at points S1 through S5, which are end points of the stubs. Waveforms observed at these observation points in this simulation are shown in FIG. 7.

Figure 6B:
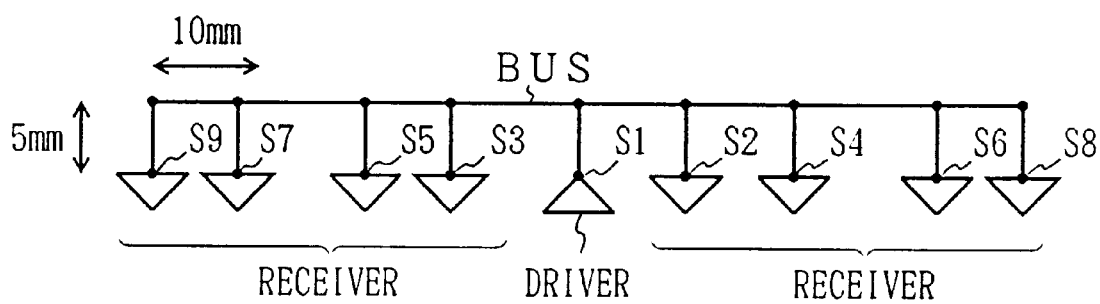
FIG. 6B is an illustrative drawing showing conditions of a simulation in which a driver at a midpoint of a bus outputs a signal to the bus, and receivers are randomly arranged along the bus.

FIG. 6B is an illustrative drawing showing conditions of a simulation in which a driver at a midpoint of a bus outputs a signal to the bus, and receivers are randomly arranged along the bus. The output signal has a frequency of 200 MHz and alternates between a high level and a low level with a period of 5 ns. Eight receivers are connected to 5-mm stubs which are arranged at random intervals. Signals are observed at points S1 through S9, which are end points of the stubs. Waveforms observed at these observation points in this simulation are shown in FIG. 8.

Figure 6C:
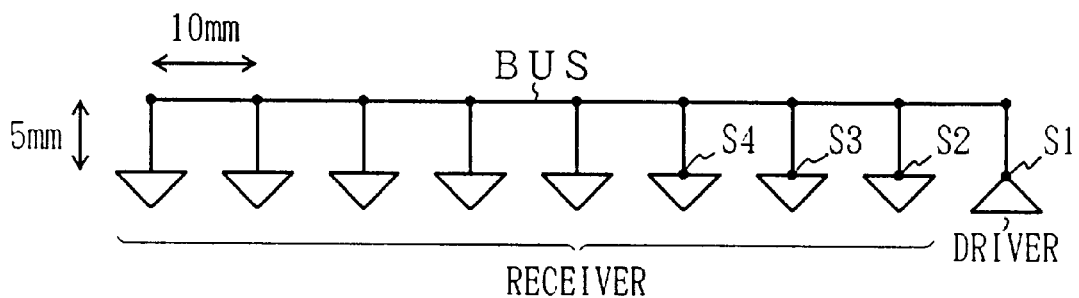
FIG. 6C is an illustrative drawing showing conditions of a simulation in which a driver at an end point of a bus outputs a signal to the bus, and receivers are arranged at equal intervals along the bus.

FIG. 6C is an illustrative drawing showing conditions of a simulation in which a driver at an end point of a bus outputs a signal to the bus, and receivers are arranged at equal intervals along the bus. The output signal has a frequency of 200 MHz and alternates between a high level and a low level with a period of 5 ns. Eight receivers are connected to 5-mm stubs which are arranged at 10-mm intervals. Signals are observed at points S1 through S4, which are end points of the stubs. Waveforms observed at these observation points in this simulation are shown in FIG. 9.

As can be seen from a comparison between FIG. 7 and FIG. 8, a signal distortion in the case of equal intervals between the stubs of receivers is smaller than that in the case of random intervals. Further, as can be seen in FIG. 8, an upper peak voltage and a lower peak voltage of the waveforms exhibit a large variation in the case of the random intervals.

Figure 9:
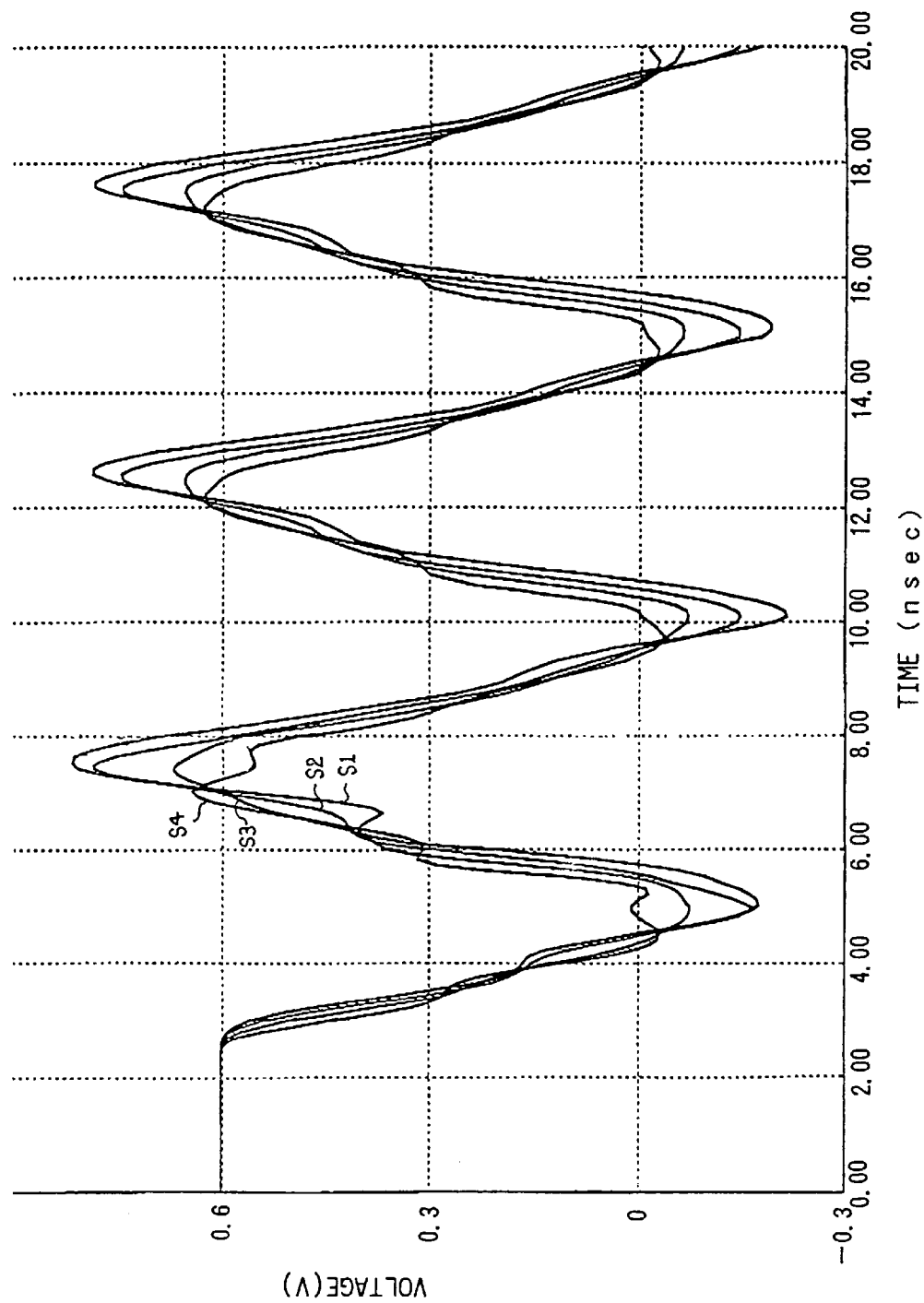
FIG. 9 is a chart showing results of a signal-transfer simulation under simulation conditions shown in FIG. 6C.

As can be seen from a comparison between FIG. 7 and FIG. 9, a signal distortion in the case of a midpoint position along the bus of the driver is smaller than that in the case of an endpoint position.

These simulation results confirm that an arrangement of the driver device 11 around a midpoint of the bus 10 and an arrangement of the nodes N1 through N4 in positions of symmetry along the bus 10 (an equal-interval arrangement can be regarded as a special case of the symmetry arrangement) are effective in suppressing an influence of signal reflection at the ends of the bus 10 and at the nodes N1 through N4. It should be noted that if the bus is looped as for the bus 10A of FIG. 5, waveforms with a little distortion similar to those of FIG. 7 are obtained.

In the following, embodiments of the present invention will be described with reference to the accompanying drawings.

Figure 10:
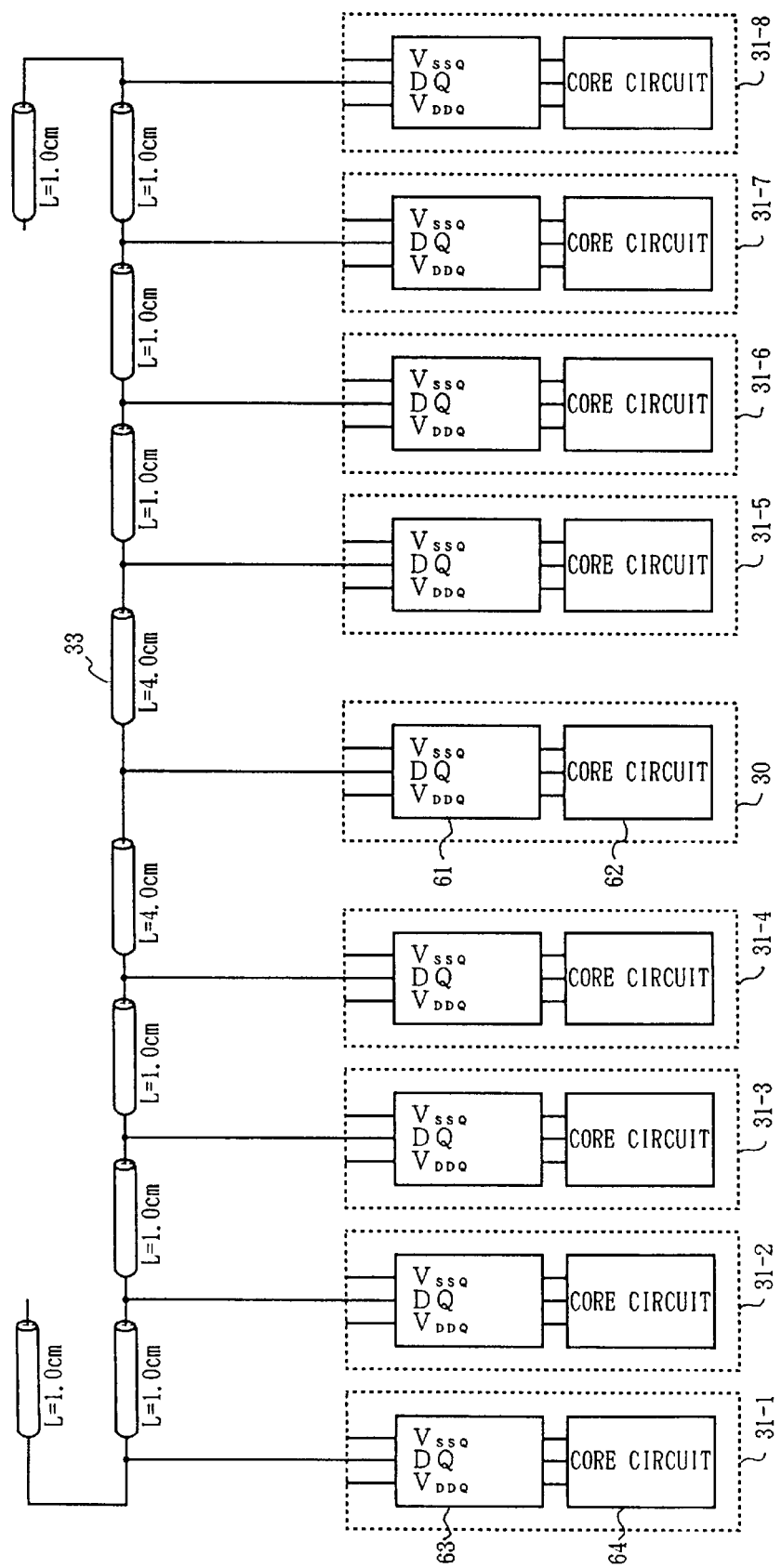
FIG. 10 is an illustrative drawing showing a first embodiment of the data-transfer system according to the present invention.

FIG. 10 is an illustrative drawing showing a first embodiment of the data-transfer system according to the present invention. The data-transfer system of FIG. 9 includes a memory controller 30, a plurality of memories 31-1 through 31-8, and a bus 33. The memory controller 30 includes an input/output circuit 61 and a core circuit 62. Each of the memories 31-1 through 31-8 includes an input/output circuit 63 and a core circuit 64. The input/output circuit 61 of the memory controller 30 and the input/output circuit 63 of the memories 31-1 through 31-8 include the output circuit as shown in FIG. 2, FIG. 3A, or FIG. 3B, and a driver transistor of the output circuit has an on-resistance whose impedance is matched with the bus 33.

Along the bus 33, the memories 31-1 through 31-4 are arranged at 1-cm intervals, and the memories 31-5 through 31-8 are also arranged at 1-cm intervals. An interval between the memory controller 30 and the memory 31-4 is 4 cm along the bus 33, and so is an interval between the memory controller 30 and the memory 31-5. Since a physical size of the memory controller 30 is bigger than that of the memories 31-1 through 31-8, the interval between the memory controller 30 and one of the memories 31-4 and 31-5 cannot be as small as the 1-cm intervals between the memories.

In FIG. 10, the memory controller 30 is positioned at a midpoint of the bus 33, and the memories 31-1 through 31-8 are connected to the bus 33 at equal intervals. With this configuration, an influence of signal reflection is suppressed to a minimum level with regard to signal reflections at the endpoints of the bus 33 and at branch points of the memories when the memory controller 30 outputs a signal to the bus 33.

Figure 11:
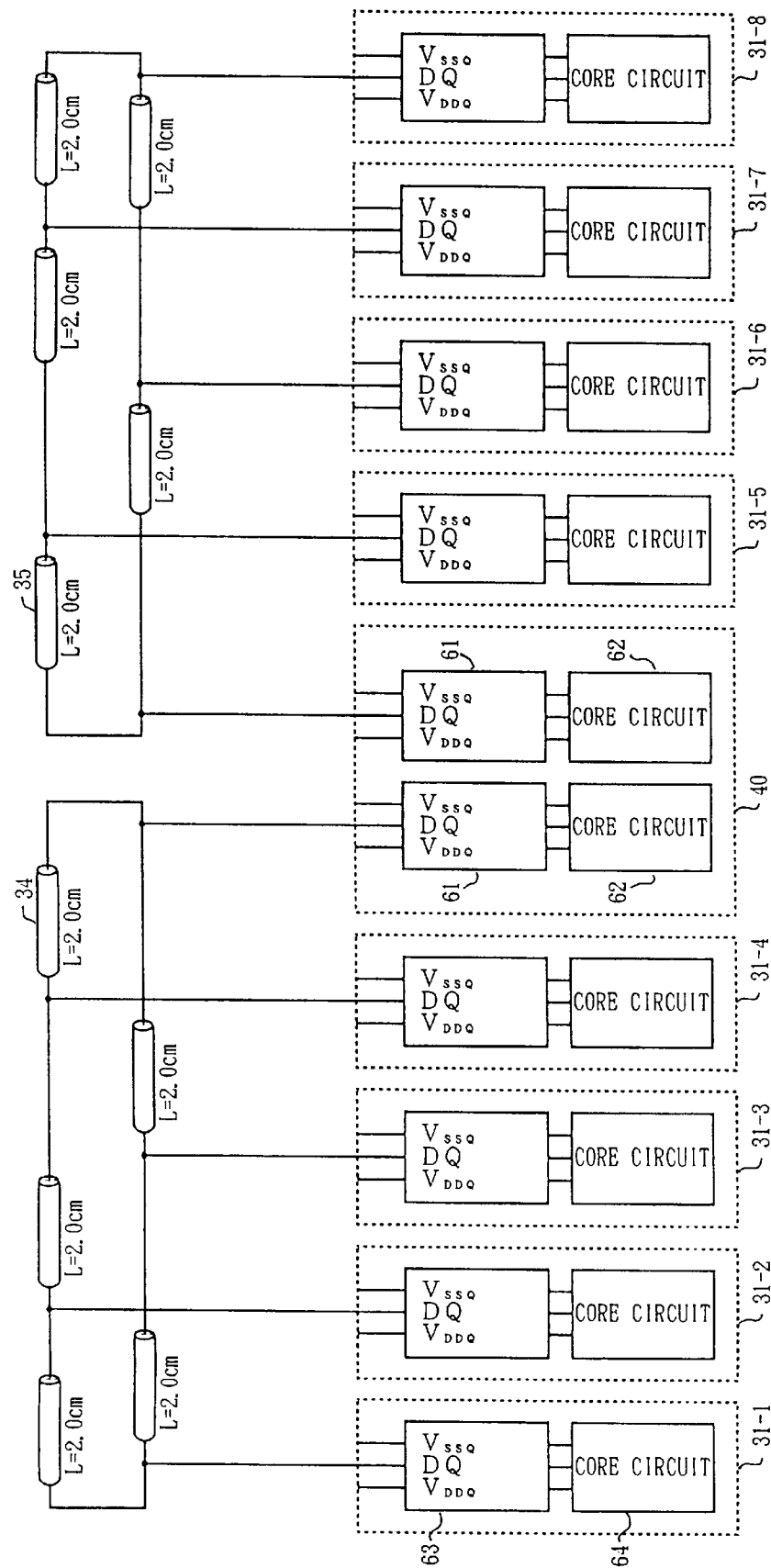
FIG. 11 is an illustrative drawing showing a second embodiment of the data-transfer system according to the present invention.

FIG. 11 is an illustrative drawing showing a second embodiment of the data-transfer system according to the present invention. In FIG. 11, the same elements as those of FIG. 10 are referred to by the same numerals, and a description thereof will be omitted.

The data-transfer system of FIG. 11 includes a memory controller 40, the memories 31-1 through 31-8, and buses 34 and 35 having a looped shape. The memory controller 40 includes two pairs of the input/output circuit 61 and the core circuit 62.

The memories 31-1 through 31-4 are arranged at 1-cm intervals along the bus 34, and the memories 31-5 through 31-8 are arranged at 1-cm intervals along the bus 35. By connecting the memory controller 40 to a point along the bus 34 where the bus 34 is folded, the memories 31-1 through 31-4 can be arranged at 1-cm intervals along the bus 34 as shown in FIG. 11 even though the physical size of the memory controller 40 is relatively large. Likewise, by connecting the memory controller 40 to a point along the bus 35 where the bus 35 is folded, the memories 31-5 through 31-8 can be arranged at 1-cm intervals along the bus 35 as shown in FIG. 11 even though the physical size of the memory controller 40 is relatively large.

When a bus in a data-transfer system is divided into two loops such as the buses 34 and 35 of FIG. 11, skews of signals received by the memories 31-1 through 31-8 can be made smaller. Here, the terminology "skew" means a displacement in signal-reception timing. If a single long loop is put in place without dividing the bus, a signal output from the memory controller 40 goes clockwise round the bus to arrive at a given memory at a different time from when a signal going counterclockwise round the bus arrives at this memory. This difference in the arrival time can be so large as to cause a significant distortion in the received signal. With a division of the bus into smaller loops such as the buses 34 and 35 of FIG. 11, a difference in the arrival time is reduced to achieve smaller skews.

As described above, the buses 34 and 35 in FIG. 11 are looped, and the memories 31-1 through 31-8 are connected to the buses 34 and 35 at equal intervals. With this configuration, an influence of signal reflection can be suppressed to a minimum level when the memory controller 40 outputs a signal.

Figure 12:
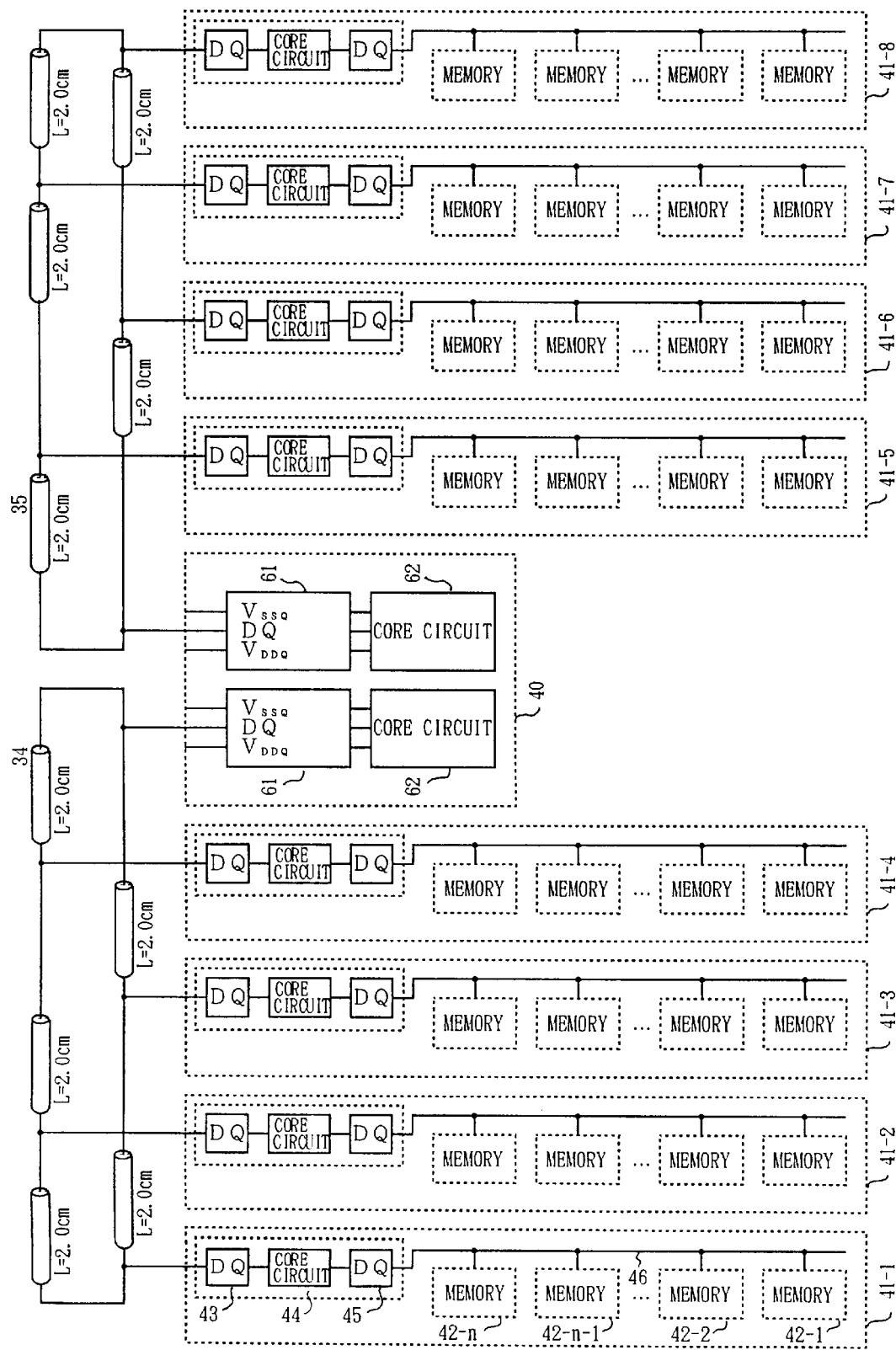
FIG. 12 is an illustrative drawing showing a third embodiment of the data-transfer system according to the present invention.

FIG. 12 is an illustrative drawing showing a third embodiment of the data-transfer system according to the present invention. In FIG. 12, the same elements as those of FIG. 11 are referred to by the same numerals, and a description thereof will be omitted. The data-transfer system of FIG. 12 differs from the data-transfer system of FIG. 11 only in that the memories 31-1 through 31-8 are replaced by memory modules 41-1 through 41-8.

Each of the memory modules 41-1 through 41-8 includes a total of n memories 42-1 through 42-n, a data-transfer buffer 43, a data-transfer core circuit 44, a data-transfer buffer 45, and an internal bus 46. Data transfer between the bus 34 or 35 and the memories 42-1 through 42-n is carried out via the data-transfer buffer 43, the data-transfer core circuit 44, the data-transfer buffer 45, and the internal bus 46. A configuration of the memory modules 41-1 through 41-8 is the same as that of a commercially available memory module, except that the data-transfer buffer 45 includes the output buffer as shown in FIG. 2, FIG. 3A, or FIG. 3B, and a description thereof will be omitted.

As shown in FIG. 12, the data-transfer system of the present invention can be applied to a configuration which uses memory modules such as the memory modules 41-1 through 41-8. Namely, the data-transfer system of the present invention can be used as part of a hierarchical memory system.

Figure 13:
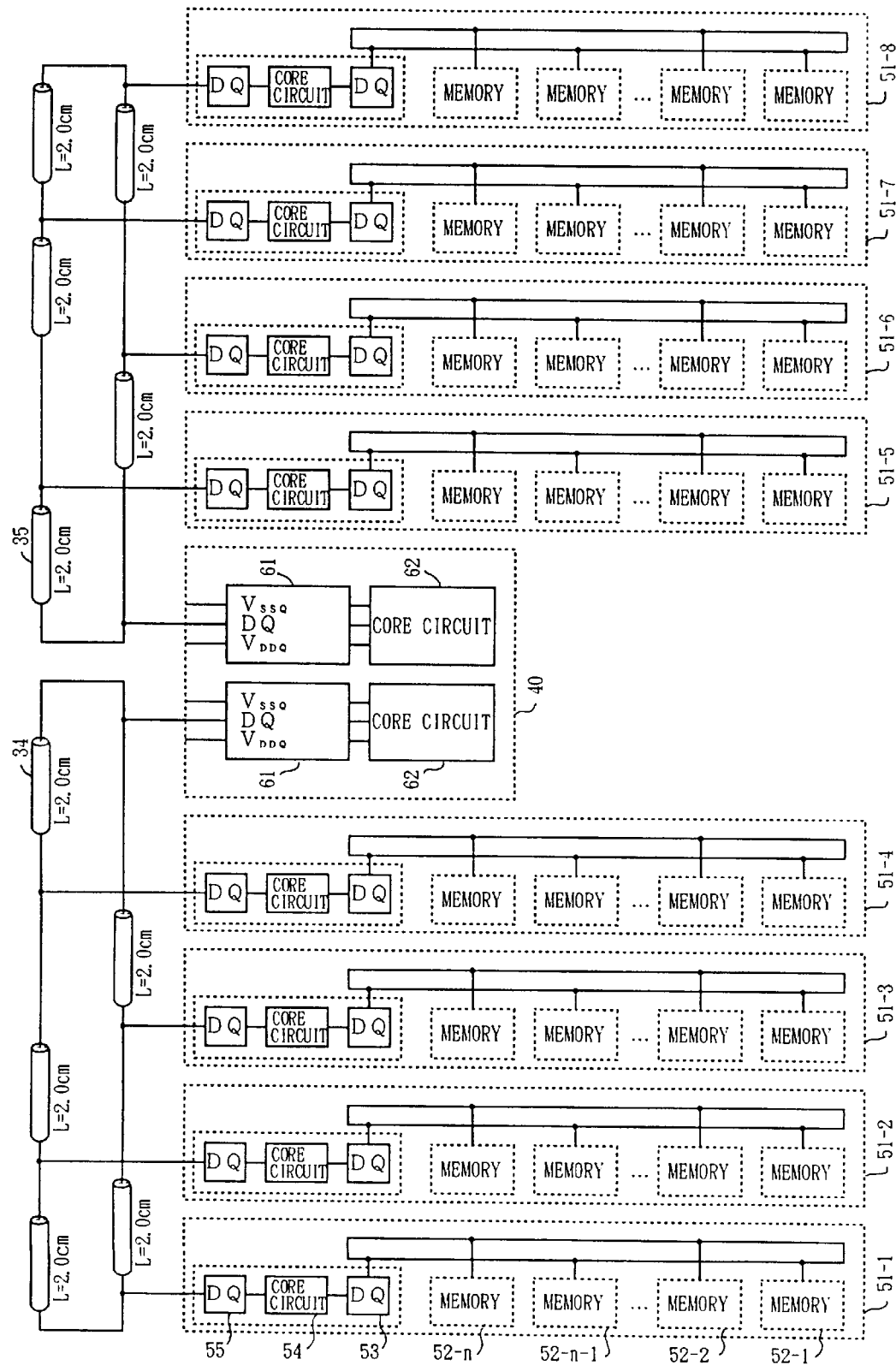
FIG. 13 is an illustrative drawing showing a fourth embodiment of the data-transfer system according to the present invention.

FIG. 13 is an illustrative drawing showing a fourth embodiment of the data-transfer system according to the present invention. In FIG. 13, the same elements as those of FIG. 12 are referred to by the same numerals, and a description thereof will be omitted. The data-transfer system of FIG. 13 is the same as that of FIG. 12, except that memory modules 51-1 through 51-8 are provided in place of the memory modules 41-1 through 41-8.

Each of the memory modules 51-1 through 51-8 includes a total of n memories 52-1 through 52-n, a data-transfer buffer 53, a data-transfer core circuit 54, a data-transfer buffer 55, and a looped internal bus 56. Data transfer between the bus 34 or 35 and the memories 52-1 through 52-n is carried out via the data-transfer buffer 53, the data-transfer core circuit 54, the data-transfer buffer 55, and the internal bus 56. A configuration of the memory modules 51-1 through 51-8 is the same as that of a commercially available memory module, except that the data-transfer buffers 53 and 55 include the output buffer of the present invention and that the internal bus structure has a looped shape, and a description thereof will be omitted.

As shown in FIG. 13, the data-transfer system of the present invention based on a looped-bus structure can be applied to the internal bus 56 of the memory modules 51-1 through 51-8. A hierarchical memory system can be built by using the data-transfer system of the present invention in every part of the system.

Figure 14A:
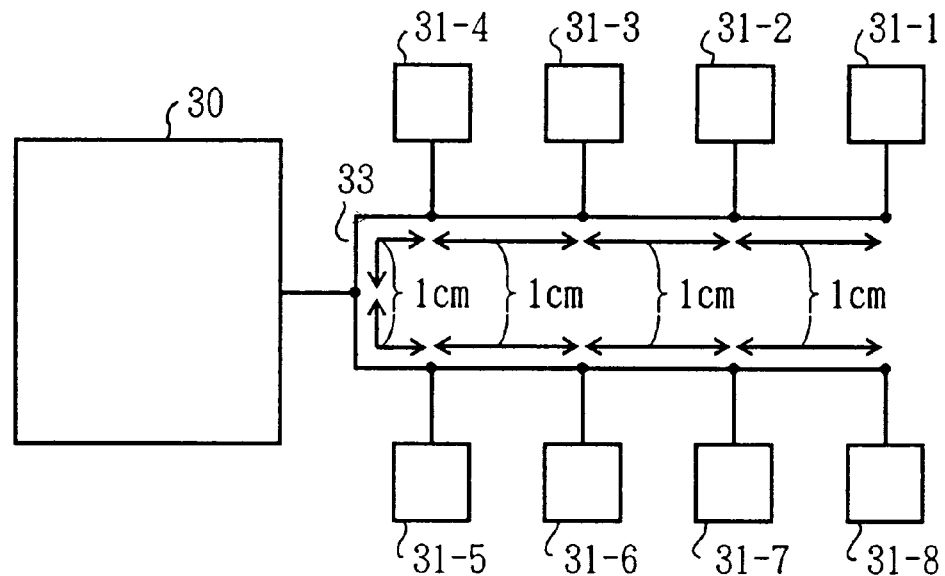
FIGS. 14A and 14B are illustrative drawings showing variations of the first embodiment shown in FIG. 10.
Figure 14B:
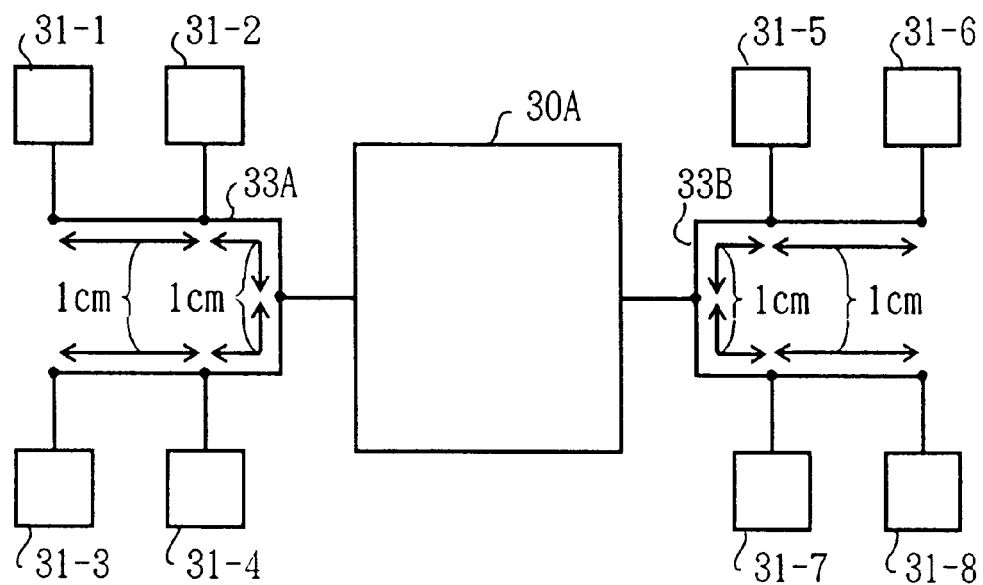

FIGS. 14A and 14B are illustrative drawings showing variations of the first embodiment shown in FIG. 10. As previously described, the first embodiment has to provide a relatively large distance (4 cm) along the bus 33 between the memory controller 30 and one of the memories 31-4 and 31-5 nearest to the memory controller 30 because of a large physical size of the memory controller 30.

In FIG. 14A, the bus 33 is folded in two, and the memory controller 30 is connected to a fold point of the bus 33. With this configuration, the memories 31-1 through 31-8 can be arranged at 1-cm intervals without being affected by a physical size of the memory controller 30.

In FIG. 14B, the bus 33 is divided into a bus 33A and a bus 33B, and each of the buses 33A and 33B is folded in two, with a memory controller 30A having two input/output nodes connected to a fold point of a respective bus. In such a configuration, the memories 31-1 through 31-8 can be arranged at 1-cm intervals without being affected by a physical size of the memory controller 30A. Further, since the bus 33 is divided into the buses 33A and 33B to shorten the bus length, skews at reception ends can be reduced by suppressing an influence of signals reflected at the bus ends. This is the same as in the second embodiment of FIG. 11 where skews are reduced by dividing the bus into the two looped buses. Namely, whether the bus has a line shape or a looped shape, it is preferable to shorten the bus length by dividing the bus since skews at reception ends can be reduced.

Figure 15:
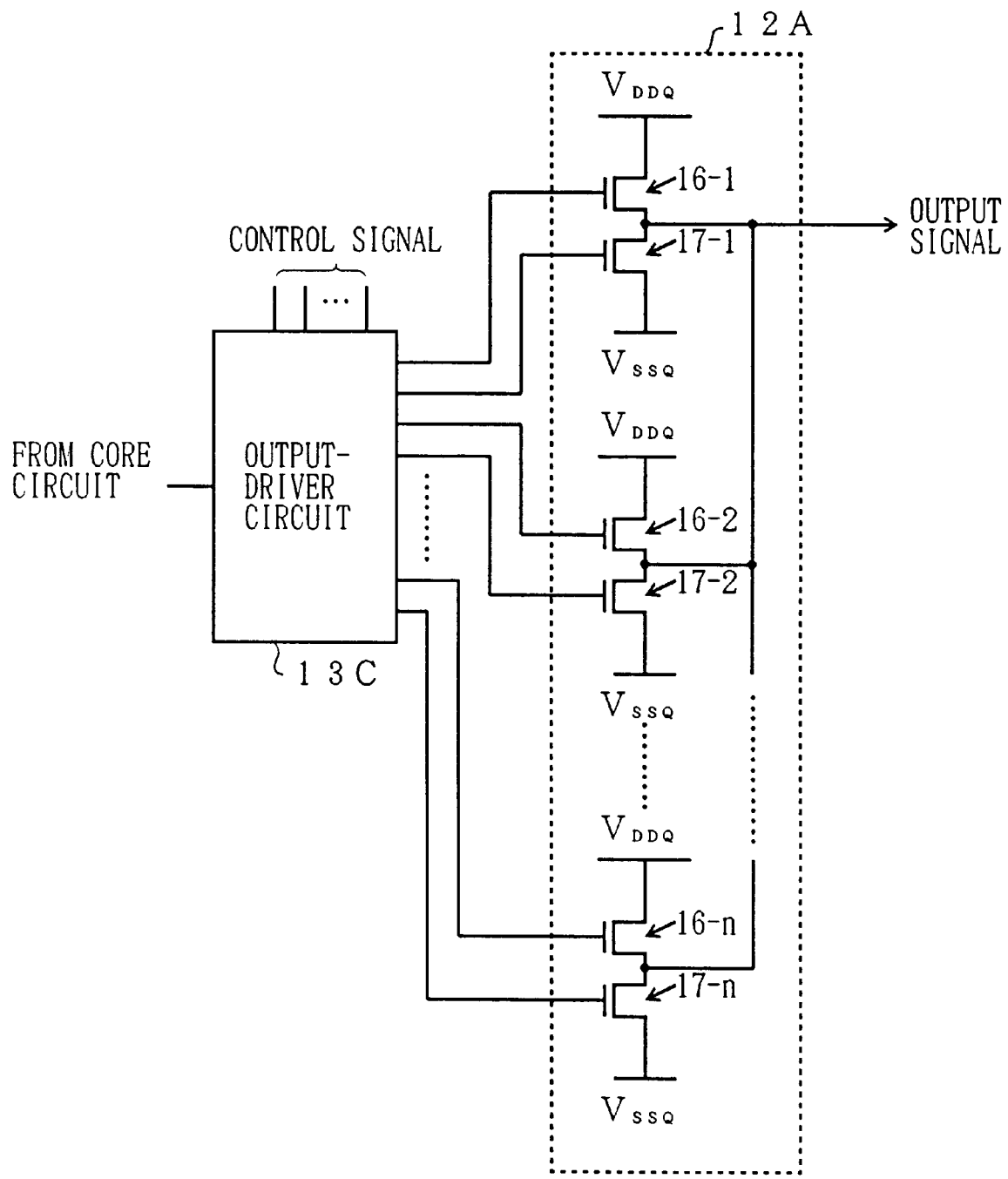
FIG. 15 is an illustrative drawing showing a variation of the output circuit and the output-driver circuit shown in FIG. 2.

FIG. 15 is an illustrative drawing showing a variation of the output circuit 12 and the output-driver circuit 13 shown in FIG. 2. The output-driver circuit 13 of FIG. 2 achieves a desired on-resistance $R_{ON}$ by applying signals of appropriate voltages to gate inputs of the driver transistors 16 and 17. In a configuration of FIG. 15, however, a desired on-resistance $R_{ON}$ is achieved by driving only a controlled number of driver transistors among driver transistors which are connected in parallel.

As shown in FIG. 15, an output circuit 12A includes driver transistors 16-1 and 17-1, 16-2 and 17-2, . . . , and 16-n and 17-n, all of which are NMOS transistors. A pair of the driver transistors 16-1 and 17-1 and all the other pairs have outputs connected in parallel (have a shared output). A gate input to each of the driver transistors receives a respective signal from an output-driver circuit 13C.

The output-driver circuit 13C receives a signal from a core circuit, and controls the output circuit 12A based on the received signal to generate an output signal. The output-driver circuit 13C also receives control signals, and controls the number of driver transistors to be driven based on these control signals. If the on-resistance of the output circuit 12A is to be reduced, the number of driver transistors to be driven should be increased. On the other hand, if the on-resistance of the output circuit 12A is to be increased, the number of driver transistors to be driven should be decreased. In this manner, the driver transistors are connected in parallel, and the number of driver transistors to be driven is adjusted, so that an effective gate width of the driver transistors can be adjusted to achieve a desired on-resistance.

The output-driver circuit 13C may be comprised of AND circuits, OR circuits, and inverters, and performs logic operations between the signal from the core circuit and the control signals to supply the gate inputs to the driver transistors to be driven. Such a configuration is within the scope of ordinary skill in the art, and can be achieved by a logic circuit having a simple structure. A detailed circuit configuration of the output-driver circuit 13C will be thus omitted.

Figure 16:
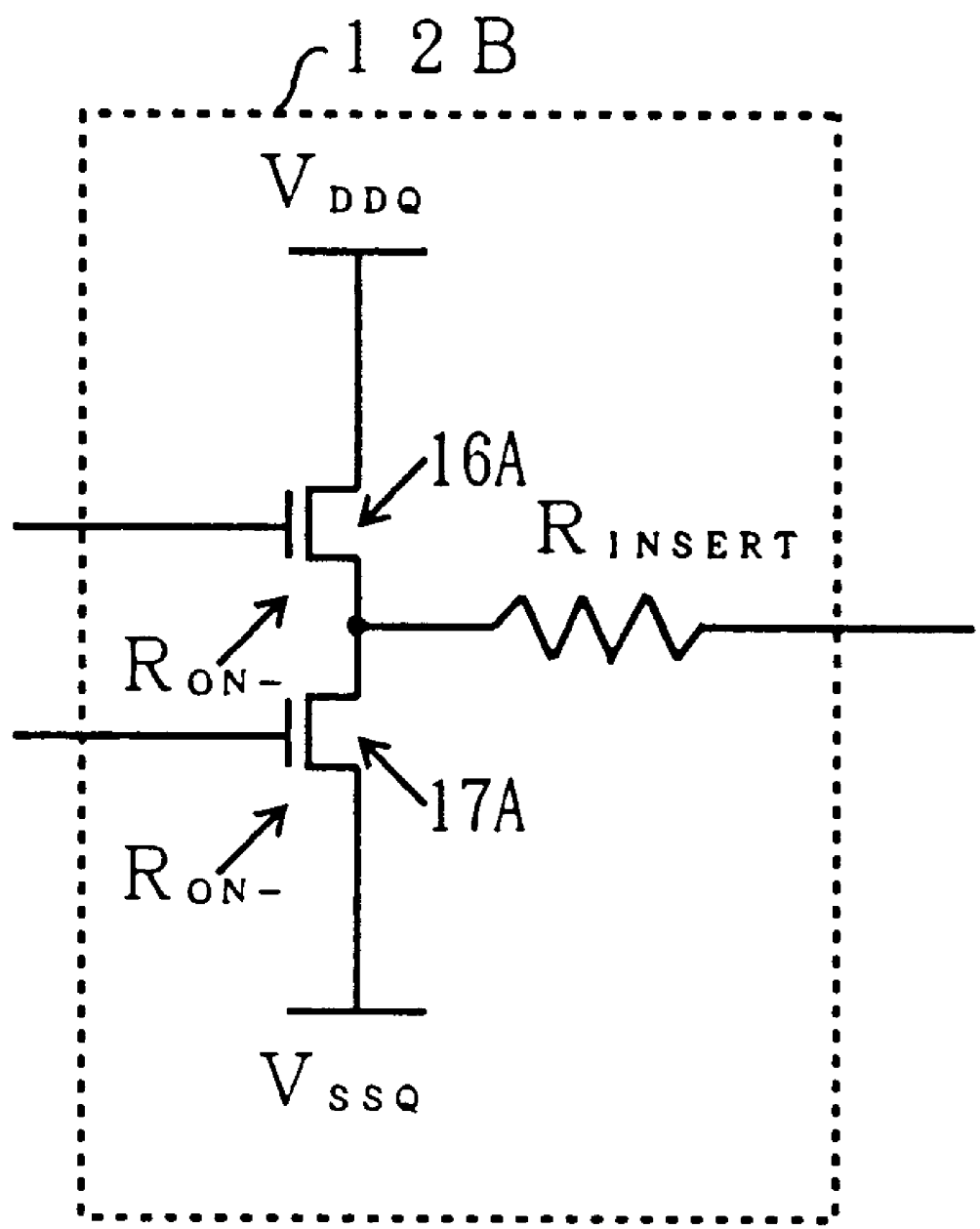
FIG. 16 is a circuit diagram showing a variation of the output circuit shown in FIG. 2.

FIG. 16 is a circuit diagram showing a variation of the output circuit 12 shown in FIG. 2. In the output circuit 12 of FIG. 2, the driver transistors 16 and 17 have the on-resistance $R_{ON}$ which is equal to $Z_0/2$. However, the impedance matching may be achieved by inserting a resistance into an intervening path of the output portion.

The output circuit 12B of FIG. 16 includes driver transistors 16A and 17A as well as a resistance $R_{INSERT}$ which is inserted into the output portion. The driver transistors 16A and 17A each have an on-resistance $R_{ON-}$. The value of the resistance $R_{INSERT}$ is selected such that $(R_{INSERT}+R_{ON-})$ is substantially equal to $Z_0/2$. This configuration can achieve impedance matching between the output circuit 12B and the bus 10 in the same manner as in the configuration of FIG. 2, so that signal reflection is suppressed between the output circuit 12B and the bus 10.

It is obvious that the insertion of a resistance for impedance matching can be applied not only to the configuration of FIG. 2, but also to any configuration provided in the above description.

As described in the above, according to one aspect of the present invention, small-amplitude signals are transferred via the line, and impedance matching is provided between the output circuit and the line, so that signals reflected at the ends of the line are absorbed at a point between the output circuit and the line without being reflected again. Therefore, a high-speed data transfer using small-amplitude signals is achieved.

According to another aspect of the present invention, the small-amplitude signals can be generated by using power voltages whose difference is smaller than about 1 V.

According to yet another aspect of the present invention, the small-amplitude signals have the same voltage difference as that of the power voltages.

According to still another aspect of the present invention, a high-speed data transfer can be achieved by using a tri-state bus.

According to another aspect of the present invention, the output circuit is comprised of two driver transistors connected in series.

According to yet another aspect of the present invention, an on-resistance of the driver transistors is in an impedance-matched relation with the line, so that an influence of signal reflection can be reduced.

According to still another aspect of the present invention, an on-resistance of the driver transistors plus an inserted resistance is in an impedance-matched relation with the line. In this configuration, an adjustment of the inserted resistance can reduce the influence of signal reflection with no need to manufacture the driver transistors as having a desired on-resistance.

According to another aspect of the present invention, a gate-input voltage of the driver transistors is adjusted such that a desired on-resistance is achieved.

According to yet another aspect of the present invention, an on-resistance obtained by connecting driver transistors in parallel is impedance-matched with the line so as to reduce an influence of signal reflection.

According to still another aspect of the present invention, an adjustment of the number of driver transistors to be driven can control an effective gate width so as to provide impedance matching.

According to another aspect of the present invention, an internal circuit is driven by a high power voltage while the output circuit is driven by a power voltage provided for the purpose of small-amplitude signal generation. Therefore, a high-speed data transfer is achieved while taking advantage of use of a conventional internal circuit.

According to yet another aspect of the present invention, the output circuit is positioned around a midpoint of the line, so that signals reflected at the ends of the line come back to the output circuit substantially at the same time. In this configuration, an influence of signal reflection can be reduced to a minimum level.

According to still another aspect of the present invention, a plurality of receiver circuits are arranged at symmetric positions with respect to a center of symmetry at the output circuit, so that signals reflected at the branch points along the line of the receiver circuits come back from corresponding points in symmetry to the output circuit substantially at the same time. In this configuration, an influence of signal reflection can be reduced to a minimum level.

According to another aspect of the present invention, a plurality of receiver circuits and the output circuit are arranged at equal intervals, so that signals reflected at the branch points along the line of the receiver circuits come back from corresponding points at an equal distance to the output circuit substantially at the same time. In this configuration, an influence of signal reflection can be reduced to a minimum level.

According to yet another aspect of the present invention, the line is folded in two, and the output circuit is connected to a fold point of the line. In this configuration, a distance between the output circuit and the receiver circuits can be shortened even if a device incorporating the output circuit has a large physical size. Because of this, a total length of the line can be shortened to reduce signal skews at receiver ends.

According to still another aspect of the present invention, the line is looped, and signals come back to the output circuit at the same time after going once round the line clockwise and counterclockwise. In this configuration, the impedance matching between the output circuit and the line helps to absorb the returning signals.

Further, the present invention is not limited to these embodiments, but various variations and modifications may be made without departing from the scope of the present invention.

What is claimed is:

1. A signal-transfer system for transferring a signal via a line having no anti-signal-reflection resistor, said signal-transfer system comprising:

a line having an equalized characteristic impedance $Z_0$; and an output circuit having an output turn-on resistance $Z_0/2$ and outputting to said line a signal which has a voltage difference between a high level and a low level smaller than about 1 V, said output circuit including two driver transistors which are connected in series and receive inputs at gates thereof, a joint point between said two driver transistors connected to said line, said two driver transistors having the same turn-on resistance, one of said two driver transistors being turned on to output said signal to said line, and said inputs to the gates of said driver transistors being constant while said driver transistors are being either turned on or turned off.

2. The signal-transfer system as claimed in claim 1, wherein said output circuit receives as power voltages a first voltage and a second voltage lower than said first voltage, said first voltage and said second voltage having a voltage difference smaller than about 1 V.

3. The signal-transfer system as claimed in claim 2, wherein said high level is said first voltage and said low level is said second voltage.

4. The signal-transfer system as claimed in claim 1, wherein said line comprises a tri-state bus, and said output circuit has an infinite output impedance when outputting no signal.

5. The signal-transfer system as claimed in claim 1, wherein said line comprises a loop.

6. The signal-transfer system as claimed in claim 1, wherein each of said two driver transistors has the turn-on resistance thereof substantially equal to $Z_0/2$.

7. The signal-transfer system as claimed in claim 1, wherein said output circuit further comprises an inserted resistance inserted between said joint point and said line, a sum of said turn-on resistance of any one of said two driver transistors and said inserted resistance being substantially equal to $Z_0/2$.

8. The signal-transfer system as claimed in claim 1, wherein said output circuit is positioned around a midpoint of said line.

9. The signal-transfer system as claimed in claim 1, further comprising a driver circuit for supplying at least one control voltage to gates of said driver transistors, wherein said driver circuit controls said turn-on resistance by adjusting said at least one control voltage.

10. The signal-transfer system as claimed in claim 1, wherein said output circuit further comprises a plurality of additional driver transistors connected in parallel to said two driver transistors, said turn-on resistance being formed by connecting said two driver transistors and said additional driver transistors together in parallel.

11. The signal-transfer system as claimed in claim 10, further comprising a driver circuit supplying inputs to gates of said driver transistors, wherein said driver circuit adjusts a number of transistors to be driven among said driver transistors so as to control said turn-on resistance.

12. The signal-transfer system as claimed in claim 2, further comprising an internal circuit outputting said signal to said line via said output circuit, wherein said internal circuit receives as power voltages a third voltage higher than said first voltage and a fourth voltage lower than said second voltage.

13. The signal-transfer system as claimed in claim 12, wherein a voltage difference between said first voltage and said second voltage is smaller than about one third of a voltage difference between said third voltage and said fourth voltage.

14. The signal-transfer system as claimed in claim 8, further comprising a plurality of receiver circuits connected to said line and receiving said signal, wherein said receiver circuits are arranged at substantially symmetric positions along said line with respect to a center of symmetry at which said output circuit is connected to said line.

15. The signal-transfer system as claimed in claim 14, wherein said line is folded in two, and said output circuit is connected to said line at a fold point of said line.

16. The signal-transfer system as claimed in claim 14, wherein said output circuit and said receiver circuits are arranged at substantially equal intervals along said line.

17. The signal-transfer system as claimed in claim 5, further comprising a plurality of receiver circuits connected to said line and receiving said signal, wherein said output circuit and said receiver circuits are arranged at substantially equal intervals along said line.

18. A signal-transfer system for transferring a signal via a line having no anti-signal-reflection resistor, said signal-transfer system comprising:

a line having an equalized characteristic impedance $Z_0$;

an output circuit having an output turn-on resistance $Z_0/2$ and outputting to said line a signal which has one of a first voltage and a second voltage lower than said first voltage, said output circuit including two driver transistors which are connected in series and receive inputs at gates thereof, a joint point between said two driver transistors connected to said line, said two driver transistors having the same turn-on resistance, and one of said two driver transistors being turned on to output said signal to said line; and an internal circuit outputting said signal to said line via said output circuit, said internal circuit being provided with a third voltage higher than said first voltage and a fourth voltage lower than said second voltage as power voltages, wherein said inputs to the gates of said driver transistors are constant while said driver transistors are being either turned on or turned off.

19. A semiconductor device for outputting a signal to a line which has an equalized characteristic impedance $Z_0$ and no anti-signal-reflection resistor, said semiconductor device comprising:

an output circuit having an output turn-on resistance $Z_0/2$ and outputting to said line a signal which has one of a first voltage and a second voltage lower than said first voltage, said output circuit including two driver transistors which are connected in series and receive inputs at gates thereof, a joint point between said two driver transistors connected to said line, said two driver transistors having the same turn-on resistance, and one of said two driver transistors being turned on to output said signal to said line; and an internal circuit outputting said signal to said line via said output circuit, said internal circuit being provided with a third voltage higher than said first voltage and a fourth voltage lower than said second voltage as power voltages, wherein said inputs to the gates of said driver transistors are constant while said driver transistors are being either turned on or turned off.

20. A semiconductor device for outputting a signal to a line which has an equalized characteristic impedance $Z_0$ and no anti-signal-reflection resistor, said semiconductor device comprising:

an output circuit having an output impedance $Z_0/2$ and outputting to said line a signal which has a voltage difference between a high level and a low level smaller than about 1 V, said output circuit including two driver transistors which are connected in series and receive inputs at gates thereof, a joint point between said two driver transistors connected to said line, said two driver transistors having the same turn-on resistance, and one of said two driver transistors being turned on to output said signal to said line; and an internal circuit using said output circuit to output said signal wherein said inputs to the gates of said driver transistors are constant while said driver transistors are being either turned on or turned off.

21. The semiconductor device as claimed in claim 20, wherein said output circuit receives as power voltages a first voltage and a second voltage lower than said first voltage, said first voltage and said second voltage having a voltage difference smaller than about 1 V.

22. The semiconductor device as claimed in claim 21, wherein said high level is said first voltage and said low level is said second voltage.

23. The semiconductor device as claimed in claim 20, wherein said output circuit has an infinite output impedance when outputting no signal.

24. The semiconductor device as claimed in claim 20, further comprising a driver circuit for supplying at least one control voltage to gates of said driver transistors, wherein said driver circuit controls said turn-on resistance by adjusting said at least one control voltage.

25. The semiconductor device as claimed in claim 20, wherein each of said two driver transistors has the turn-on resistance thereof substantially equal to $Z_0/2$.

26. The semiconductor device as claimed in claim 20, wherein said output circuit further comprises an inserted resistance inserted between said joint point and said line, a sum of said turn-on resistance of any one of said two driver transistors and said inserted resistance being substantially equal to $Z_0/2$.

27. The semiconductor device as claimed in claim 20, wherein said output circuit further comprises a plurality of additional driver transistors connected in parallel to said two driver transistors, said turn-on resistance being formed by connecting said two driver transistors and said additional driver transistors together in parallel.

28. The semiconductor device as claimed in claim 27, further comprising a driver circuit supplying inputs to gates of said driver transistors, wherein said driver circuit adjusts a number of transistors to be driven among said driver transistors so as to control said turn-on resistance.

29. The semiconductor device as claimed in claim 21, wherein said internal circuit receives as power voltages a third voltage higher than said first voltage and a fourth voltage lower than said second voltage.

30. The semiconductor device as claimed in claim 29, wherein a voltage difference between said first voltage and said second voltage is smaller than about one third of a voltage difference between said third voltage and said fourth voltage.

* * * * *